United States Patent
Shakil et al.

(10) Patent No.: US 12,173,751 B2
(45) Date of Patent: Dec. 24, 2024

(54) MULTIPAD HYBRID CONICAL FOIL BEARING

(71) Applicant: Hamilton Sundstrand Corporation, Charlotte, NC (US)

(72) Inventors: Ali Shakil, West Hartford, CT (US); Zachary Alex Schuster, Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 78 days.

(21) Appl. No.: 18/103,783

(22) Filed: Jan. 31, 2023

(65) Prior Publication Data
US 2024/0255020 A1 Aug. 1, 2024

(51) Int. Cl.
| | |
|---|---|
| *F16C 17/10* | (2006.01) |
| *F16C 17/04* | (2006.01) |
| *F16C 37/00* | (2006.01) |
| *F16C 43/02* | (2006.01) |

(52) U.S. Cl.
CPC ............ *F16C 17/042* (2013.01); *F16C 17/10* (2013.01); *F16C 37/002* (2013.01); *F16C 43/02* (2013.01)

(58) Field of Classification Search
CPC ...... F16C 17/024; F16C 17/042; F16C 17/10; F16C 37/002; F16C 43/02
See application file for complete search history.

(56) References Cited

U.S. PATENT DOCUMENTS

| | | | |
|---|---|---|---|
| 3,382,014 A | 5/1968 | John | |
| 4,260,205 A | 4/1981 | Spies | |
| 4,262,975 A * | 4/1981 | Heshmat | F16C 17/024 384/119 |
| 4,295,689 A * | 10/1981 | Licht | F16C 27/02 384/103 |

(Continued)

FOREIGN PATENT DOCUMENTS

| | | |
|---|---|---|
| CN | 113266643 B | 8/2022 |
| DE | 102020120536 B3 | 11/2021 |

(Continued)

OTHER PUBLICATIONS

Machine Translation of KR 101165607 (Year: 2012).*
Extended European Search Report for European Patent Application No. 24154812.2, dated Jun. 13, 2024, 5 pages.

*Primary Examiner* — Alan B Waits
(74) *Attorney, Agent, or Firm* — Kinney & Lange, P.A.

(57) ABSTRACT

A conical bearing includes a bearing sleeve, a bump foil, and a top foil. The bearing sleeve extends along an axis from a first open end to a second open end. The bearing sleeve has an axially tapered shape such that a first diameter of the bearing sleeve is greater than a second diameter of the bearing sleeve. An interior surface of the bearing sleeve has a non-circular profile. The bump foil is concentrically disposed within the bearing sleeve and includes bump foil pad segments extending circumferentially about the interior surface of the bearing sleeve. Each bump foil pad segment comprises a plurality of foil bumps and the plurality of foil bumps varies in stiffness along a circumference of the bump foil. The top foil is concentrically disposed within the bump foil and includes top foil pad segments extending circumferentially about an interior surface of the bump foil.

20 Claims, 10 Drawing Sheets

(56) References Cited

U.S. PATENT DOCUMENTS

| | | | |
|---|---|---|---|
| 4,465,384 A * | 8/1984 | Heshmat | F16C 17/024 |
| | | | 384/106 |
| 5,228,785 A | 7/1993 | Saville et al. | |
| 5,427,455 A | 6/1995 | Bosley | |
| 5,498,083 A | 3/1996 | Brown | |
| 5,634,723 A * | 6/1997 | Agrawal | F16C 17/024 |
| | | | 384/106 |
| 5,902,049 A * | 5/1999 | Heshmat | F16C 27/02 |
| | | | 384/106 |
| 8,029,194 B2 | 10/2011 | Agrawal et al. | |
| 8,215,928 B2 | 7/2012 | Agrawal et al. | |
| 9,394,941 B2 | 7/2016 | Ryu | |
| 2002/0097927 A1* | 7/2002 | Lee | F16C 33/14 |
| | | | 384/103 |
| 2017/0089387 A1* | 3/2017 | Kim | F16C 43/02 |
| 2021/0277937 A1* | 9/2021 | Elbibary | F16C 17/024 |

FOREIGN PATENT DOCUMENTS

| | | | | | |
|---|---|---|---|---|---|
| GB | 2180012 A | * | 3/1987 | | F16C 17/024 |
| JP | S58160619 A | | 9/1983 | | |
| KR | 101165607 B1 | * | 7/2012 | | |

* cited by examiner

MULTIPAD HYBRID CONICAL FOIL BEARING

BACKGROUND

The present invention relates generally to foil bearings, and in particular to a conical foil bearing design.

Turbomachinery supported on hydrodynamic foil bearings typically requires a set of journal and thrust bearings to support radial and axial loads. Conical bearings support both radial and axial loads, which eliminates the need for thrust bearings. However, most foil journal bearings are cylindrical. Limited conical bearing designs, with cylindrical bores on either end of the sleeve, rely on uniform spring stiffness in a single or multipad configuration with limited capability to support dynamic operational loads.

SUMMARY

As discussed herein, a conical bearing includes a bearing sleeve, a bump foil, and a top foil. The bearing sleeve extends along an axis from a first open end to a second open end. The bearing sleeve has an axially tapered shape such that a first open end diameter of the bearing sleeve is greater than a second open end diameter of the bearing sleeve. An interior surface of the bearing sleeve has a non-circular profile. The bump foil is concentrically disposed within the bearing sleeve with respect to the axis and includes a plurality of bump foil pad segments extending circumferentially about the interior surface of the bearing sleeve. Each bump foil pad segment comprises a plurality of foil bumps and the plurality of foil bumps varies in stiffness along a circumference of the bump foil. The top foil is concentrically disposed within the bump foil with respect to the axis and includes a plurality of top foil pad segments extending circumferentially about an interior surface of the bump foil.

As further discussed herein, a shaft system includes a shaft and a conical bearing oriented about an end of the shaft. The conical bearing includes a bearing sleeve, a bump foil, and a top foil. The bearing sleeve extends along an axis from a first open end to a second open end. The bearing sleeve has an axially tapered shape such that a first open end diameter of the bearing sleeve is greater than a second open end diameter of the bearing sleeve. An interior surface of the bearing sleeve has a non-circular profile. The bump foil is concentrically disposed within the bearing sleeve with respect to the axis and includes a plurality of bump foil pad segments extending circumferentially about the interior surface of the bearing sleeve. Each bump foil pad segment comprises a plurality of foil bumps and the plurality of foil bumps varies in stiffness along a circumference of the bump foil. The top foil is concentrically disposed within the bump foil with respect to the axis and includes a plurality of top foil pad segments extending circumferentially about an interior surface of the bump foil.

As also discussed herein, a method of manufacturing a conical bearing includes manufacturing a bearing sleeve of the conical bearing such that the bearing sleeve extends about a central bearing sleeve cavity from a first open end to a second open end and has a tapered shape such that a first open end diameter of the bearing sleeve is greater than a second open end diameter of the bearing sleeve, and such that an interior surface of the bearing sleeve has a non-circular profile. A plurality of bump foil pad segments are manufactured, wherein each bump foil pad segment comprises a plurality of foil bumps and the plurality of foil bumps varies in stiffness along a length of the bump foil pad segment. A plurality of top foil pad segments are manufactured. The bump foil pad segments are assembled into a bump foil which extends about a central bump foil cavity from a first open end to a second open end and has a tapered shape such that a first open end diameter of the bump foil is greater than a second open end diameter of the bump foil. The top foil pad segments are assembled into a top foil which extends about a central top foil cavity from a first open end to a second open end and has a tapered shape such that a first open end diameter of the top foil is greater than a second open end diameter of the top foil. The bump foil is inserted into the central bearing sleeve cavity through the first open end of the bearing sleeve such that the bump foil is concentrically disposed within the bearing sleeve with respect to an axis about which the bearing sleeve extends. The top foil is inserted into the central bump foil cavity through the first open end of the bump foil such that the top foil is concentrically disposed within the bump foil with respect to the axis.

The present summary is provided only by way of example, and not limitation. Other aspects of the present disclosure will be appreciated in view of the entirety of the present disclosure, including the entire text, claims, and accompanying figures.

Figures 1A, 1B:
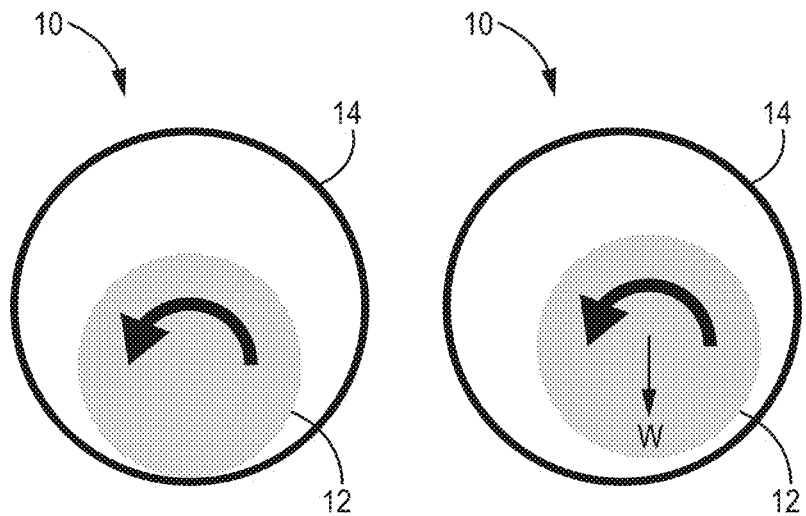
FIGS. 1A-1B are schematic depictions of a shaft's movement within a bearing sleeve during rotation and hydrodynamic pressure generation.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A conical bearing can incorporate foils, including a bump foil having varying bump pitch and/or bump height to better control bearing stiffness at locations which are expected to experience higher load during shaft rotation. The foils can be segmented and axially split for easier assembly. The bearing sleeve of the conical bearing can be additively manufactured to include features such as support slots or dovetails to retain the foil ends, anti-rotation tabs, cooling channels, and/or cooling holes. The cooling holes extending from the bearing sleeve's outer diameter to the inner diameter enable a hybrid bearing configuration for improved load-capacity of the bearing. The interconnecting holes further assist in heat dissipation from the bearing. The cooling channels on the outer diameter of the bearing sleeve can provide air flow passages to dissipate heat from the conical bearing via forced convection.

Each end of the conical bearing has a non-cylindrical inner diameter and can include a three-pad configuration. This allows the pads to be designed to control the geometry of each pad for offset. Additionally, the pads can be designed to be preloaded such that the center of curvature of the pad or lobe is not coincident with the geometric center of the bearing. Each lobe assists in hydrodynamic pressure generation from the leading edge to the trailing edge when the shaft is rotating counterclockwise. The sleeve inner diameter profile transitions from diverging to converging in order to assist in hydrodynamic pressure build up. The compliant bump foils on the leading edge engage with the bearing sleeve's inner diameter first. As the shaft speed increases along with the dynamic load, the bumps near the trailing edge start to become engaged with the sleeve, thus providing load support. In essence, bump foils compliance increases from leading to the trailing edge in the circumferential direction. The hydrodynamic air film thickness decreases from leading to the trailing edge. Additionally, the bump foils can be split axially along the length of the bearing to allow for improved bump foil stiffness. This axial split provides compliance to the dynamic load, minimizing foil deformation.

Figure 2:
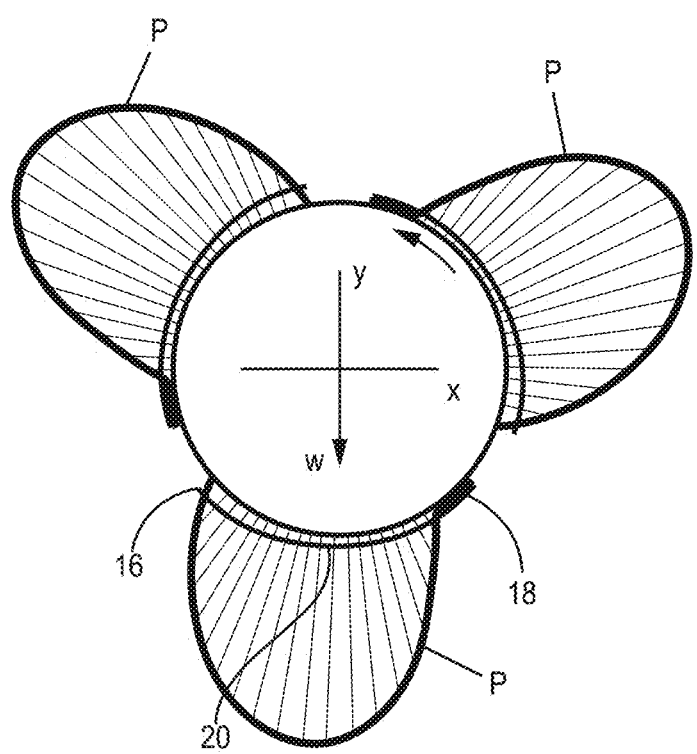
FIG. 2 is a schematic depiction of a bearing.

FIGS. 1A-1B are schematic sectional depictions of shaft system 10. Shaft system 10 includes shaft 12 and bearing 14. FIG. 2 is a schematic depiction of the load experienced by bearing 14 due to the rotation of shaft 12 within bearing 14. FIGS. 1A-2 will be discussed in turn below.

As shown in FIG. 1A, shaft 12 rests on bearing 14 when shaft 12 is not rotating due to gravity. As shaft 12 begins to rotate (shown in FIGS. 1A-1B), it draws air and creates a hydrodynamic pressure wedge between the shaft 12 and bearing 14. This hydrodynamic pressure wedge lifts shaft 12 off of the foil geometry of bearing 14. FIG. 2 depicts the load W exerted by shaft 12 on bearing 14 and the hydrodynamic pressure P generated by bearing 14 during the rotation of shaft 12. Hydrodynamic pressure P generated by bearing 14 varies at different points in the rotation of shaft 12. Hydrodynamic pressure P is highest at particular points in the rotation of shaft 12 (which occur repeatedly at particular locations along bearing 14). Hydrodynamic pressure typically increases along the leading edge 16 of the foil sections of bearing 14 and is greatest near the trailing edge 18 of each foil section (specifically, at or near point 20, where the air film is also at a minimum). As described in more detail below, varying bump pitch and/or bump height, and axial split along the pad length within the foil geometry of bearing 14 allows for targeted dynamic stiffness control in these areas. This allows bearing liftoff to be more efficiently achieved, and bearing loading can be adjusted based on the expected loads and performance of the bearing.

Figure 3A:
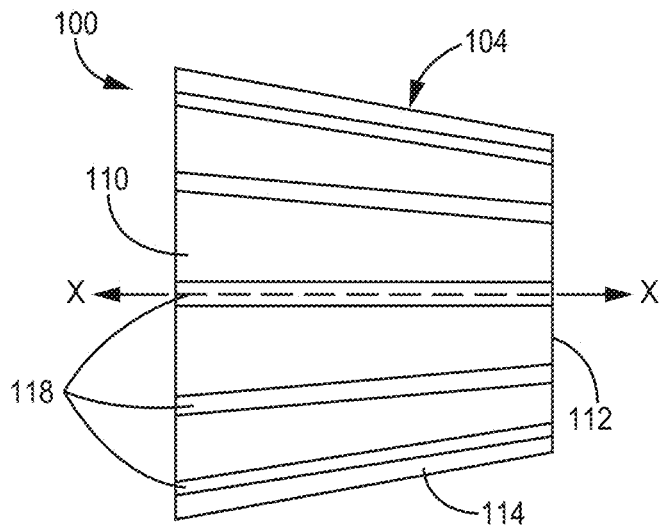
FIG. 3A is a side view of a conical bearing.
Figure 3B:
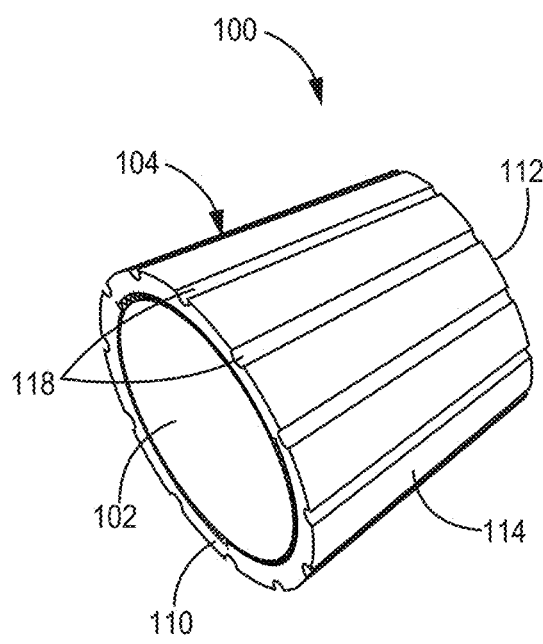
FIG. 3B is a perspective view of an inner end of the conical bearing of FIG. 3A.
Figure 3C:
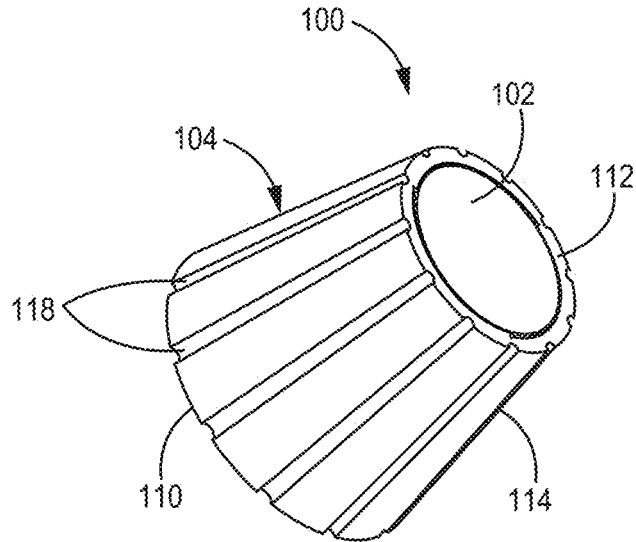
FIG. 3C is a perspective view of an outer end of the conical bearing of FIG. 3A.

FIG. 3A is a side view of conical bearing 100 about shaft 102 and disposed along axis X. Conical bearing 100 includes bearing sleeve 104, bump foil 106 (shown in FIGS. 4A-4B), and top foil 108 (shown in FIGS. 4A-4B). Conical bearing 100 extends from inner end 110 to outer end 112 and includes exterior surface 114 and interior surface 116 (shown in FIG. 5B). In the example shown in FIGS. 3A-3C, bearing sleeve 104 includes cooling channels 118. FIG. 3B is a perspective view of inner end 110 of conical bearing 100. FIG. 3C is a perspective view of outer end 112 of conical bearing 100. FIGS. 3A-3C will be discussed concurrently.

Conical bearing 100 has a hollow, axially tapered shape such that the diameter of a first open end (such as inner end 110) is greater than the diameter of an opposite second open end (such as outer end 112). Outer end 112 and inner end 110 are shaped such that a section of shaft 102 can extend through interior cavity 116 (shown in FIG. 5B) of conical bearing 100. As described in more detail below in reference to FIGS. 6A-6C, the tapered shape of conical bearing 100 can support both radial and axial loads exerted by shaft 102 during rotation. In some examples, conical bearing 100 has a length of between approximately 0.5 inches (approximately 12.7 millimeters) and approximately 3 inches (approximately 76.2 millimeters).

Bearing sleeve 104 forms an outer layer of conical bearing 100 with respect to the location of shaft 102. Bearing sleeve 104, including cooling channels 118, can be additively manufactured. Bump foil 106 forms a middle layer of conical bearing 100 and is located on the interior of bearing sleeve 104, being concentrically disposed within bearing sleeve 104 with respect to axis X when conical bearing 100 is assembled. Top foil 108 forms an inside layer of conical bearing 100 and is adjacent to shaft 102, and is concentrically disposed within bump foil 106 with respect to axis X when conical bearing 100 is assembled. Bump foil 106 and top foil 108 can be single wrap foils, such that each of bump foil 106 and top foil 108 form a single layer about shaft 102. Bump foil 106 and top foil 108 can be formed of the same material. In some examples, bump foil 106 and top foil 108 are formed of a high-strength nickel-based alloy.

Bump foil 106 distributes the load exerted by shaft 102 on conical bearing 100 when shaft 102 rotates. As described in more detail below in reference to FIGS. 6A-6C, bump foil 106 can have a varying stiffness due to variations in bump geometry along bump foil 106. Bump foil 106 can be formed out of a flat sheet and shaped with a die.

Figure 4A:
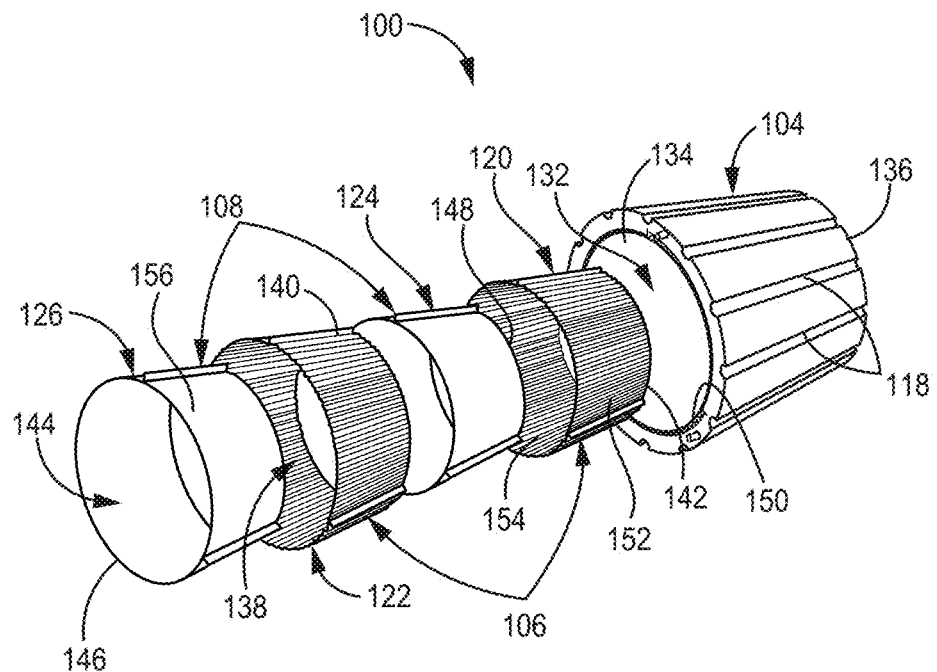
FIG. 4A is a partially exploded view of the conical bearing of FIG. 3A.
Figure 4B:
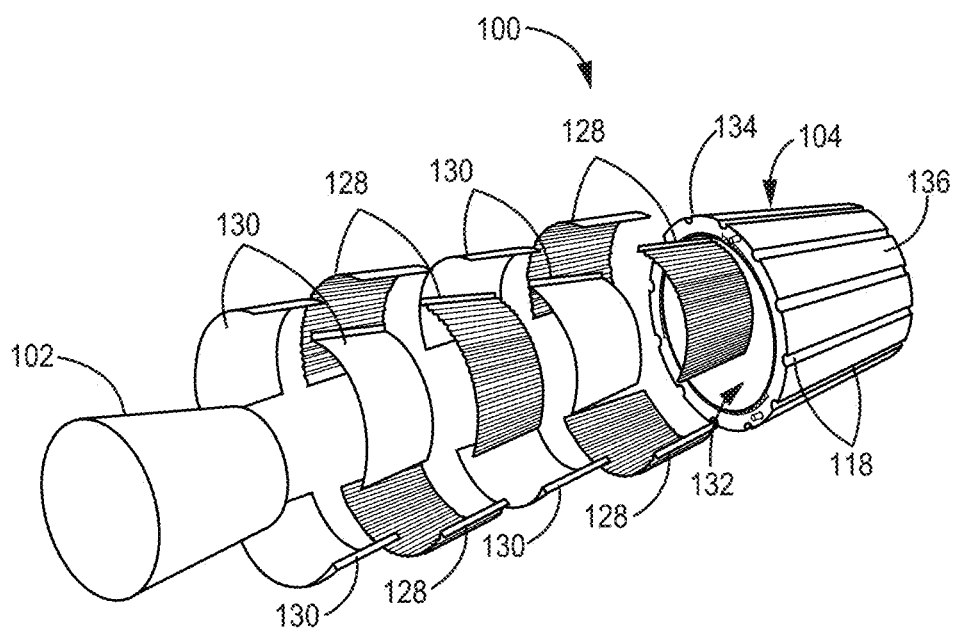
FIG. 4B is an exploded view of the conical bearing of FIG. 3A with a shaft portion.
Figure 5A:
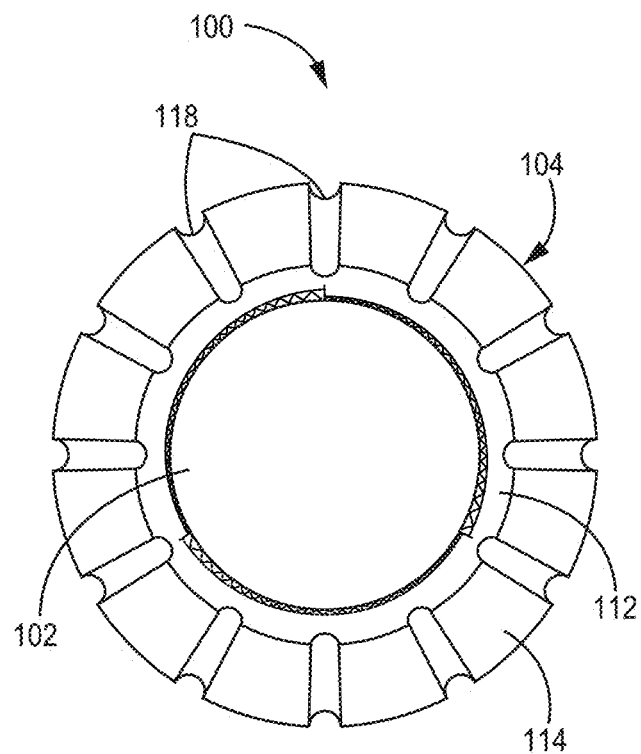
FIG. 5A is a side view of the conical bearing of FIG. 3A at the outer end.
Figure 5B:
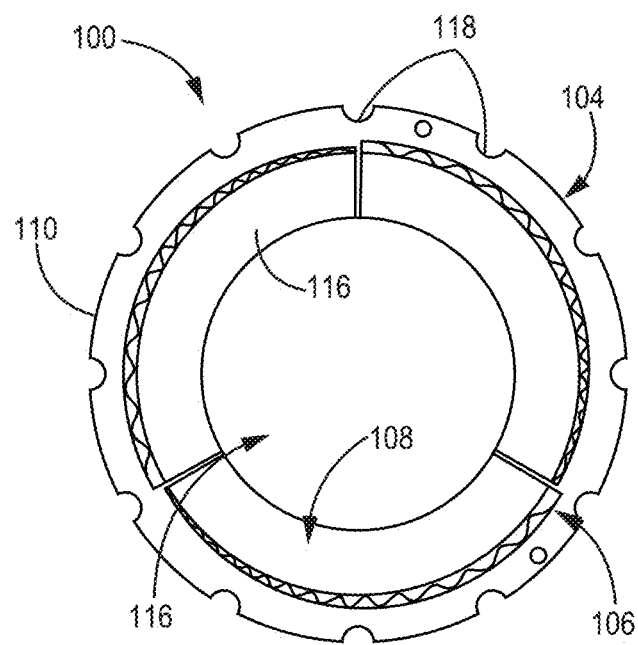
FIG. 5B is a side view of the conical bearing of FIG. 3A at the inner end.

FIG. 4A is a partially exploded view of conical bearing 100, and FIG. 4B is an exploded view of conical bearing 100 and shaft 102. Conical bearing 100 includes bearing sleeve 104, bump foil 106, and top foil 108. Conical bearing 100 extends from inner end 110 (shown in FIGS. 3A-3C and 5B) to outer end 112 (shown in FIGS. 3A-3C and 5A), and includes exterior surface 114 (shown in FIGS. 3A-3C and 5A) and interior surface 116 (shown in FIG. 5B). In the example depicted in FIGS. 4A-5B, bearing sleeve 104 includes cooling channels 118. Bump foil 106 is axially split and includes first bump foil section 120 and second bump foil section 122 (both shown in FIG. 4A). Top foil 108 is axially split, and includes first top foil section 124 and second top foil section 126. First bump foil section 120 and second bump foil section 122 can each include bump foil pad segments 128 (shown in FIG. 4B). First top foil section 124 and second top foil section 126 can each include top foil pad segments 130 (shown in FIG. 4B). Bearing sleeve 104 extends about central bearing sleeve cavity 132 from first open end 134 to second open end 136. Bump foil 106 extends about central bump foil cavity 138 from first open end 140 to second open end 142. Top foil 108 extends about central top foil cavity 144 from first open end 146 to second open end 148. Exterior surface 114 of conical bearing 100 is the exterior surface of bearing sleeve 104, and bearing sleeve 104 also includes interior surface 150. Bump foil 106 has an exterior surface 152 and an interior surface 154. Interior surface 116 of conical bearing 100 is the interior surface of top foil 108, and top foil 108 also includes exterior surface 156. FIG. 5A is a top plan view of outer end 112 of conical bearing 100. FIG. 5B is a bottom plan view of inner end 110 of conical bearing 100. FIGS. 4A-5B will be discussed concurrently below.

As described in more detail below in reference to FIG. 7C, the thickness of bearing sleeve 104 can vary to accommodate the shape of bump foil 106, and interior surface 150 of bearing sleeve 104 can have a non-circular profile. In the example depicted in FIG. 4A, each of first bump foil section 120 and second bump foil section 122 includes three bump foil pad segments 128. Similarly, each of first top foil section 124 and second top foil section 126 includes three top foil pad segments 130. In some examples, bump foil pad segments 128 can be evenly circumferentially distributed such that each bump foil pad segment 128 makes up approximately one third of the circumference of bump foil 106. Similarly, top foil pad segments 130 can be evenly circumferentially distributed such that each top foil pad segment 130 makes up approximately one third of the circumference of top foil 108.

The stiffness of bump foil 106 can be varied circumferentially along the length of each bump foil pad section 128 (from the leading edge to the trailing edge). To increase bearing stiffness and damping, the bump foil pitch can be increased from each leading edge to each trailing edge, the bump foil height can be decreased from each leading edge to each trailing edge, or a combination of decreased pitch and increased height can be used. In these designs, the bearing assembly clearance can decrease from the leading edge to the trailing edge.

Both bump foil pad segments 128 and top foil pad segments 130 can be insertable into bearing sleeve 104 through central bearing sleeve cavity 132. Top foil pad segments 130 can be insertable into bump foil pad segments 128 after bump foil pad segments 128 are assembled into bump foil 106 and/or inserted into bearing sleeve 104. As described in more detail below in reference to FIGS. 8-9, each bump foil pad segment 128 and/or top foil pad segment 130 can include geometry which slots into, and is secured by, bearing sleeve support features.

Figure 6:
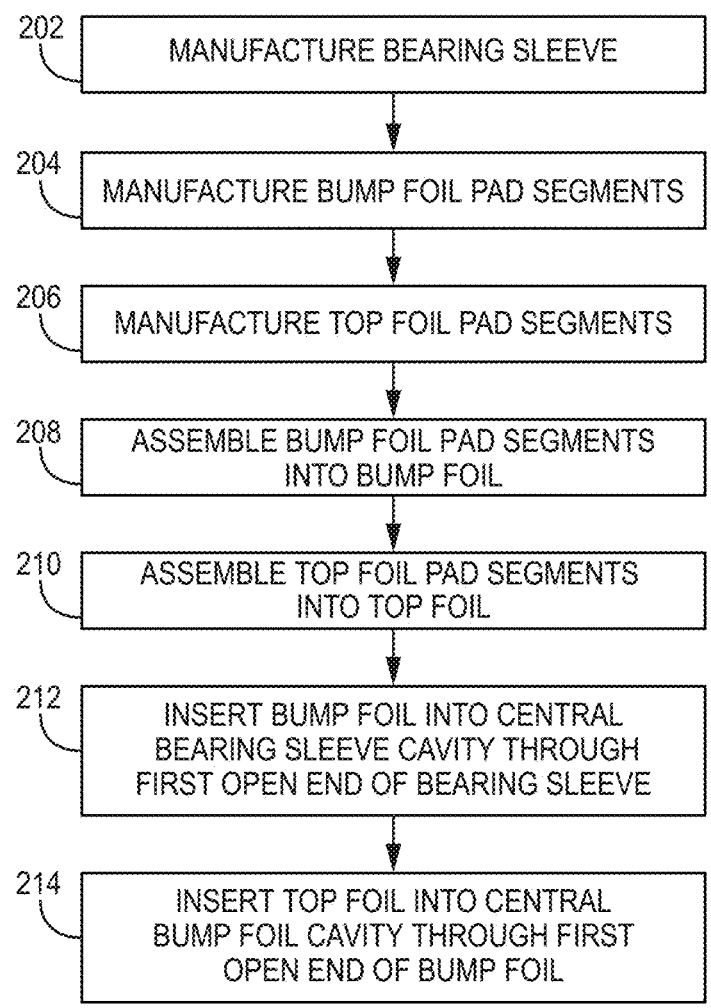
FIG. 6 depicts a method of manufacturing a conical bearing.

FIG. 6 depicts method 200 of manufacturing a conical bearing (such as conical bearing 100 described above in reference to FIGS. 3A-5B). Method 200 includes steps 202-214.

In step 202, a bearing sleeve of the conical bearing is manufactured. The bearing sleeve can extend about a central bearing sleeve cavity (such as central bearing sleeve cavity 132, shown in FIGS. 4A-4B) and can have a tapered shape such that the diameter of a first open end of the bearing sleeve (such as first open end 134 of bearing sleeve 104, shown in FIGS. 4A-4B) is greater than the diameter of a second open end of the bearing sleeve (such as second open end 136 of bearing sleeve 104, shown in FIGS. 4A-4B). The bearing sleeve can be additively manufactured and can, in some examples, include additively manufactured cooling channels and/or cooling holes. Additively manufacturing the bearing sleeve can include forming any of: at least one support slot in an interior surface of the bearing sleeve, at least one support dovetail in an interior surface of the bearing sleeve, a plurality of cooling channels in an exterior surface of the bearing sleeve, a plurality of cooling holes extending radially outward through the bearing sleeve such that an interior end of each cooling hole is adjacent to the central bearing sleeve cavity and an exterior end of each cooling hole is within a cooling channel, and/or any combination of forming these features. Additionally or alternatively, the cooling holes and/or cooling channels can be formed by subtractive manufacturing processes such as milling.

In step 204, a plurality of bump foil pad segments (such as bump foil pad segments 128, shown in FIG. 4B) are manufactured. Each bump foil pad segment can include a plurality of foil bumps which varies in stiffness along a length of the bump foil pad segment. The bump foil pad segments can be formed out of a sheet of a sheet metal and can be shaped with a die to form the plurality of foil bumps.

In step 206, a plurality of top foil pad segments (such as top foil pad segments 130, shown in FIG. 4B) are manufactured. The top foil pad segments can be formed out of a sheet metal.

In step 208, the bump foil pad segments are assembled into a bump foil (such as bump foil 106, shown in FIG. 4A). The bump foil can extend about a central bump foil cavity (such as central bump foil cavity 138, shown in FIG. 4A) from a first open end (such as first open end 140 of bump foil 106, shown in FIG. 4A) to a second open end (such as second open end 142 of bump foil 106, shown in FIG. 4A) and can have a tapered shape such that the diameter of the first open end of the bump foil is greater than the diameter of the second open end of the bump foil.

In step 210, the top foil pad segments are assembled into a top foil (such as top foil 108, shown in FIG. 4A). The top foil can extend about a central top foil cavity (such as central top foil cavity 144, shown in FIG. 4A) from a first open end (such as first open end 146 of top foil 108, shown in FIG. 4A) to a second open end (such as second open end 148 of top foil 108, shown in FIG. 4A) and can have a tapered shape such that the diameter of the first open end of the top foil is greater than the diameter of the second open end of the top foil.

In step 212, the bump foil is inserted into the central bearing sleeve cavity through the first open end of the bearing sleeve. In some examples, one or more protruding sections of the bump foil can slide into a corresponding section on the interior surface of the bearing sleeve (such as support dovetails and/or support slots).

In step 214, the top foil is inserted into the central bump foil cavity through the first open end of the bump foil. In some examples, one or more protruding sections of the top foil can slide into a corresponding section on the interior surface of the bearing sleeve (such as support dovetails and/or support slots).

Figure 7A:
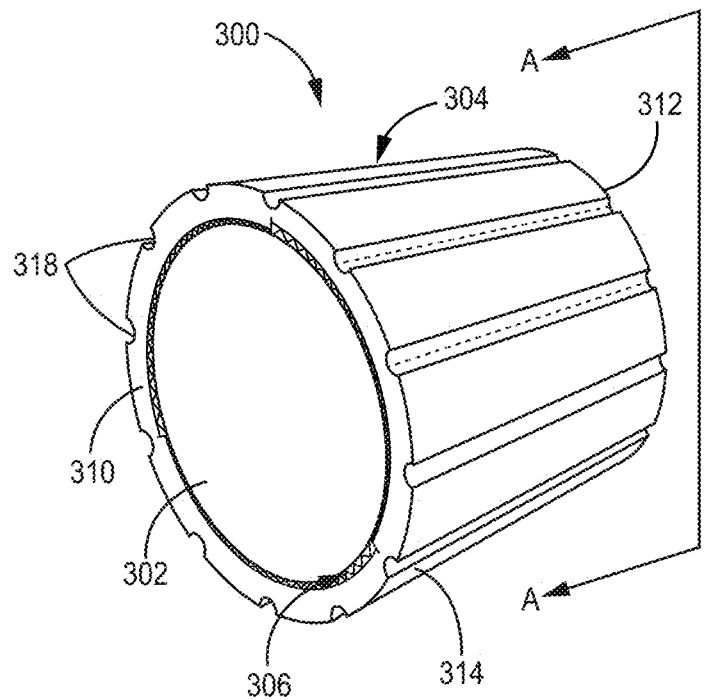
FIG. 7A is a perspective view of an inner end of a conical bearing including varying dimension bump foils.
Figure 7B:
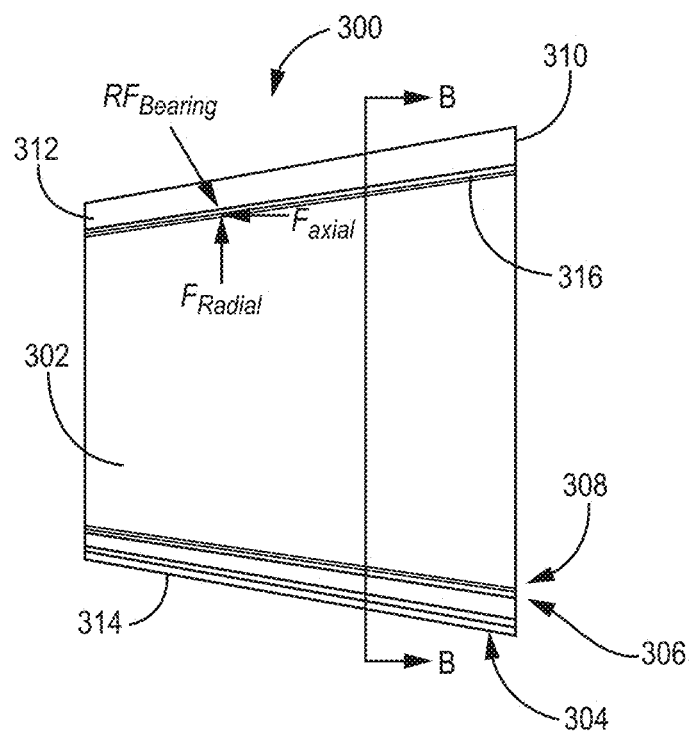
FIGS. 7B-7C are cross-sectional views of the conical bearing of FIG. 7A.

FIG. 7A is a perspective view of an inner end of conical bearing 300 about shaft 302. Conical bearing 300 includes bearing sleeve 304, bump foil 306, and top foil 308 (shown in FIGS. 7B-7C). Conical bearing 300 extends from inner end 310 to outer end 312 and includes exterior surface 314 and interior surface 316 (shown in FIGS. 7B-7C). In the example shown in FIGS. 7A-7C, bearing sleeve 304 includes cooling channels 318. Bump foil 306 includes foil bumps 320 (shown in FIG. 7C). FIG. 7B is a cross-sectional view of conical bearing 300 along plane A (shown in FIG. 7A). FIG. 7C is a cross-sectional view of a portion of conical bearing 300 along plane B (shown in FIG. 7B). FIGS. 7A-7C will be discussed concurrently below.

Conical bearing 300 can operate in substantially the same manner as conical bearing 100 (described above in reference to FIGS. 3A-5B and 7A-7C) with respect to the support of shaft 302 during rotation.

Figure 7C:
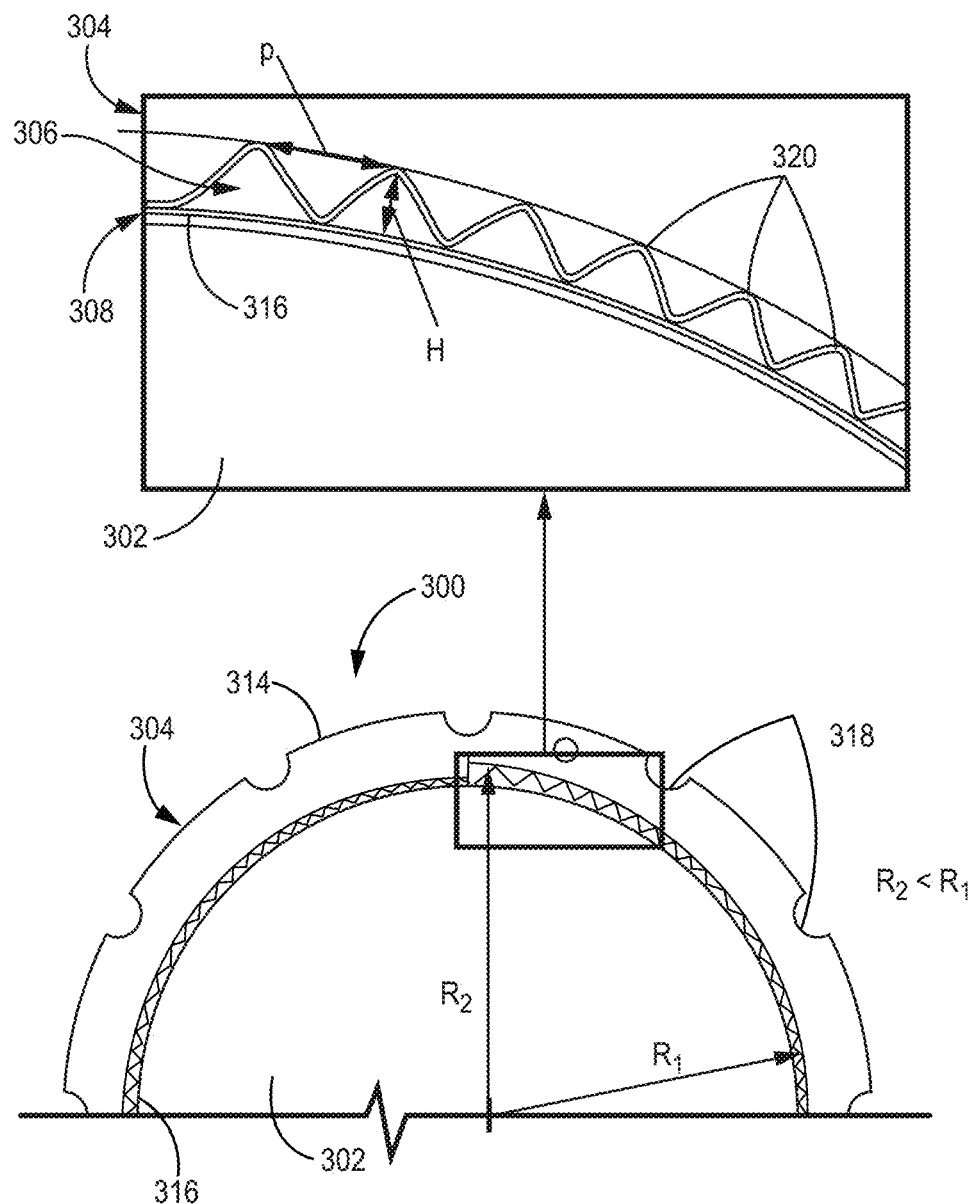

As shown in FIGS. 7A and 7C, bump foil 306 can have a varying geometry along its circumference in order to vary the stiffness of bump foil 306. This can be achieved by, for example, varying the bump height and/or bump pitch of bump foil 306 along its circumference (as described above in reference to FIGS. 4A-4B). As described above in reference to FIG. 2, the loads exerted by shaft 302 vary based on the rotational position of shaft 302. The stiffness of bump foil 306 can be varied to distribute the expected loads exerted by shaft 302 at different rotational positions. As shown in FIG. 7C, the radius of bearing sleeve 304 can also be varied along the circumference of bearing sleeve 304 to accommodate the differing dimensions of bump foil 306 and the expected movement of shaft 302 during rotation. For example, radius R1 of bearing sleeve 304 (aligning with an area of lesser bump height and greater bump pitch within bump foil 306) is less than radius R2 (aligning with an area of greater bump height and lesser bump pitch within bump foil 306, as well as with the location of maximum pre-load on the bearing). The varying radius of bearing sleeve 304 can result in a non-circular profile of the interior surface of bearing sleeve 304. This varying radius of bearing sleeve 304 is shown in FIG. 7C (also shown in FIGS. 2 and 5B), and can assist in generation of hydrodynamic pressure from the leading edge of each bump foil pad section to the trailing edge.

As shown in FIG. 7B, shaft 302 exerts force on conical bearing 300 as shaft 302 rotates. Shaft 302 exerts radial force on conical bearing 300 along direction $F_{radial}$ and exerts axial force on conical bearing 300 along direction $F_{axial}$. As the loads exerted by shaft 302 vary based on the rotational position of shaft 302, conical bearing 300 can distribute the varying loads exerted by shaft 302 through the variable stiffness of bump foil 306.

As shown in FIG. 7C, bump foil 306 can include a plurality of foil bumps 320. Each foil bump 320 has a bump height H and a bump pitch p. Foil bumps 320 can vary in height and/or pitch along the circumference of bump foil 306 in order to vary the stiffness of bump foil 306. As described above in reference to FIG. 2, the loads exerted by shaft 302 vary based on the rotational position of shaft 302. The stiffness of bump foil 306 can be tailored at different points to achieve the necessary load distribution.

Figure 8:
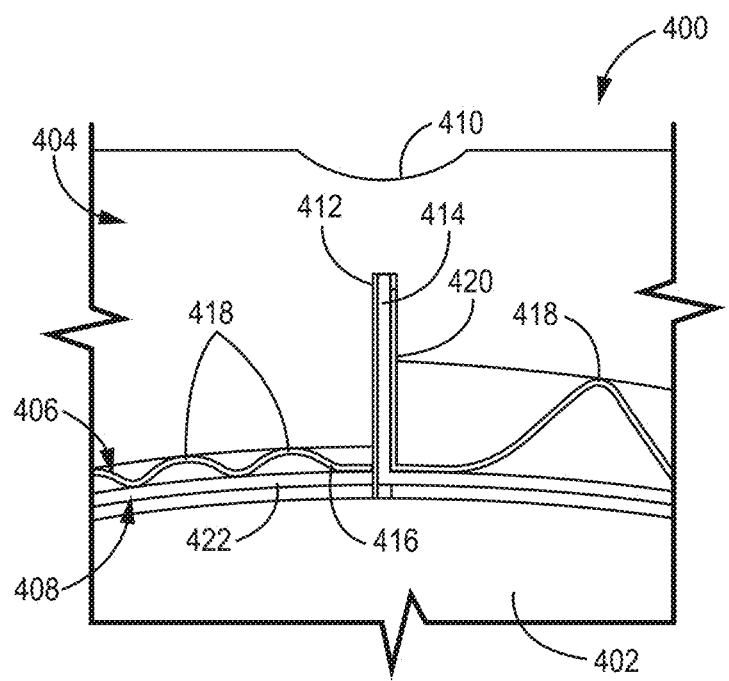
FIG. 8 is a cross-sectional view of a support slot for foils within a conical bearing.

FIG. 8 is a cross-sectional view of a portion of conical bearing 400 and a portion of shaft 402. Conical bearing 400 includes bearing sleeve 404, bump foil 406, and top foil 408. Conical bearing 400 extends from an inner end (not shown in FIG. 8) to an outer end (not shown in FIG. 8). Bearing sleeve 404 includes cooling channel 410 and support slot 412. Bump foil 406 includes bump foil leading edge 414, bump foil trailing edge 416, and foil bumps 418. Top foil 408 includes top foil leading edge 420 and top foil trailing edge 422.

Conical bearing 400 can operate in substantially the same manner as conical bearing 100 (described above in reference to FIGS. 3A-5B and 7A-7C) with respect to the support of shaft 402 during rotation.

Bump foil leading edge 414 and top foil leading edge 420 can extend radially outward from the center of bump foil 406 and top foil 408, respectively. Support slot 412 can be shaped to match the geometry (for example, the length and angle) of bump foil leading edge 414 and top foil leading edge 420. In the example shown in FIG. 8, support slot 412 is a slot which extends radially outward from the center of bearing sleeve 404 and which extends axially along bearing sleeve 404 in the same manner as cooling channel 410. When conical bearing 400 is assembled, bump foil leading edge 414 and top foil leading edge 420 can be slidably inserted into support slot 412 to secure the respective bump foil or top foil pad segment within bearing sleeve 404. Additionally, support slot 412 can secure bump foil leading edge 414 and top foil leading edge 420 during rotation of shaft 402 by pinning the foils in place at their respective leading edges. In designs including one or more support slots 412, bump foil trailing edge 416 and top foil trailing edge 422 are left free. In examples where each of bump foil 406 and top foil 408 include three pad sections extending circumferentially about the foil, bearing sleeve 404 can include three support slots 412.

Figure 9:
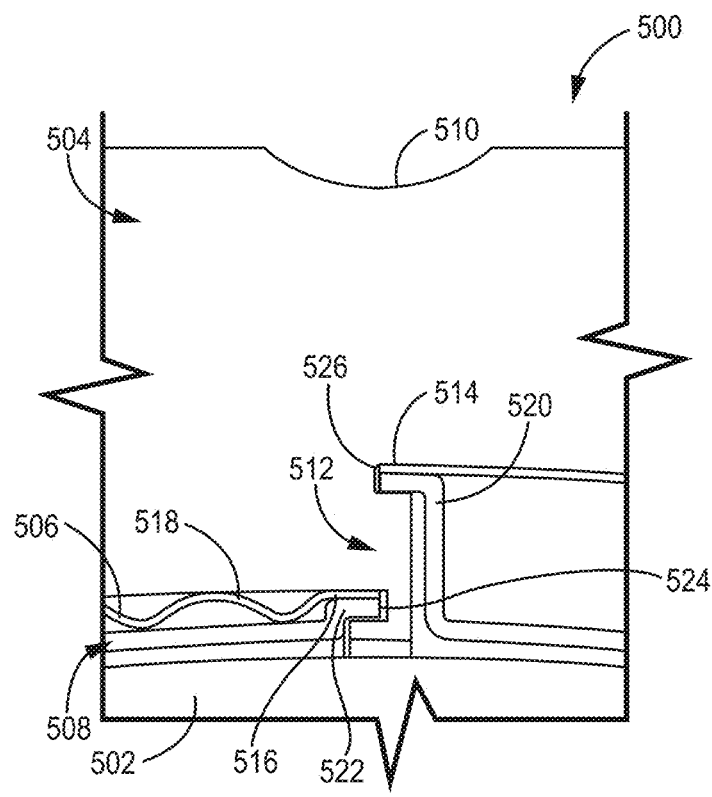
FIG. 9 is a cross-sectional view of a support dovetail for foils within a conical bearing.

FIG. 9 is a cross-sectional view of a portion of conical bearing 500 and a portion of shaft 502. Conical bearing 500 includes bearing sleeve 504, bump foil 506, and top foil 508. Conical bearing 500 extends from an inner end (not shown in FIG. 9) to an outer end (not shown in FIG. 9). Bearing sleeve 504 includes cooling channel 510 and support dovetail 512. Bump foil 506 includes bump foil leading edge 514, bump foil trailing edge 516, and foil bumps 518. Top foil 508 includes top foil leading edge 520 and top foil trailing edge 522. Support dovetail 512 can include leading edge side 524 and trailing edge side 526.

Conical bearing 500 can operate in substantially the same manner as conical bearing 100 (described above in reference to FIGS. 3A-5B and 7A-7C) with respect to the support of shaft 502 during rotation.

Top foil leading edge 520 and top foil trailing edge 522 can each have a stepped shape. In this manner, a portion of both top foil leading edge 520 and top foil trailing edge 522 can extend radially outward from the center of top foil 508. A radially outermost portion of both top foil leading edge 520 and top foil trailing edge 522 can extend circumferentially from the radially extending portions, in the same manner as the rest of top foil 508. Support dovetail 512 can extend radially inward toward the center of bearing sleeve 504 and can be shaped to match the geometry (for example, the length, shape, and angle) of top foil leading edge 520 and top foil trailing edge 522. In the example shown in FIG. 9, support dovetail 512 includes two recessed areas (leading edge side 524 and trailing edge side 526) to receive the corresponding geometry of bump foil 506 and top foil 508. When conical bearing 500 is assembled, top foil leading edge 520 can be slidably inserted into leading edge side 524 of support dovetail 512 to secure the leading edge of the respective top foil pad segment within bearing sleeve 504. Similarly, top foil trailing edge 522 can be slidably inserted into trailing edge side 526 of support dovetail 516 to secure the trailing edge of the respective top foil pad segment within bearing sleeve 504. Additionally, support dovetail 512 can secure bump foil leading edge 514 and top foil leading edge 520 during rotation of shaft 502 by retaining the foils in place at their respective leading edges. Similarly, support dovetail 512 can secure bump foil trailing edge 516 and top foil trailing edge 522 during rotation of shaft 502 by retaining the foils in place at their respective trailing edges. In this manner, in designs including one or more support dovetails 512, bump foil leading edge 514, bump foil trailing edge 516, top foil leading edge 520, and top foil trailing edge 522 are secured by the geometry of support dovetail(s) 512. In examples where each of bump foil 506 and top foil 508 include three pad sections extending circumferentially about the foil, bearing sleeve 504 can include three support dovetails 512 which align with the end of each pad section.

Figure 10A:
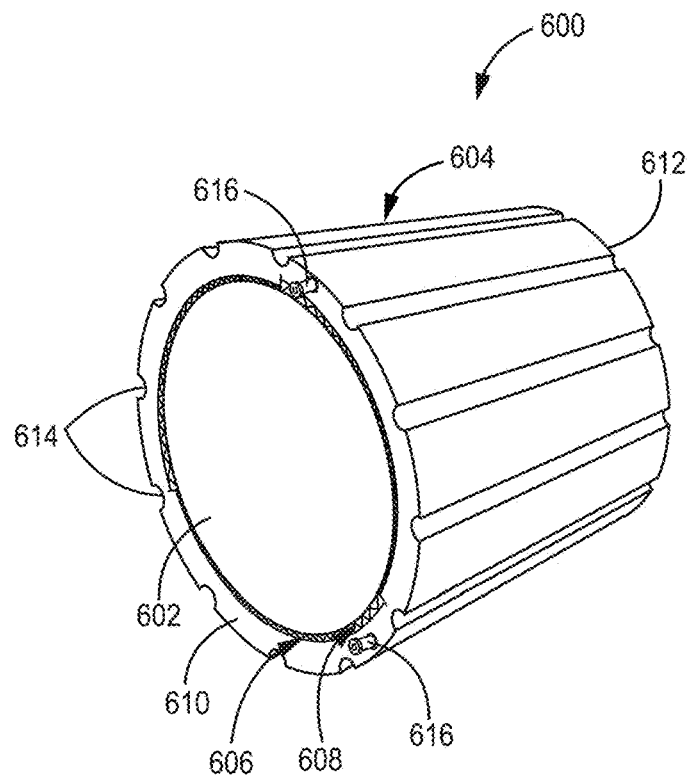
FIG. 10A is a perspective view of a conical bearing including anti-rotation tabs.
Figure 10B:
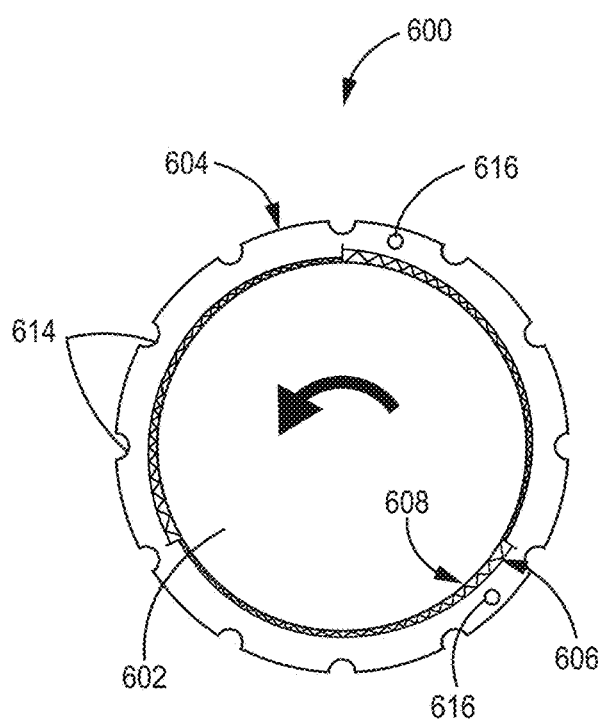
FIG. 10B is a side view of the conical bearing of FIG. 10A.

FIG. 10A is a perspective view of conical bearing 600 oriented about shaft 602. Conical bearing 600 includes bearing sleeve 604, bump foil 606, and top foil 608. Conical bearing 600 extends from inner end 610 to outer end 612. In the example shown in FIGS. 10A-10B, bearing sleeve 604 includes cooling channels 614 and anti-rotation tabs 616. FIG. 10B is a side view of conical bearing 600 at inner end 612. FIGS. 10A-10B will be discussed concurrently.

Conical bearing 600 can be made in substantially the same way, and operate in substantially the same manner with respect to the support of shaft 602 during rotation, as conical bearing 100 (described above in reference to FIGS. 3A-7C).

Bearing sleeve 604 can include one or more anti-rotation tabs 616. Anti-rotation tabs 616 can be built with bearing sleeve 604 during the additive manufacturing build process, such that bearing sleeve 604 is a monolithic structure. Alternatively, anti-rotation tabs 616 can be built separately, and bearing sleeve 604 can be assembled after construction. Anti-rotation tabs 616 help to prevent rotation of bearing sleeve 604 during operation (that is, during rotation of shaft 602). In some examples, anti-rotation tabs 616 can be fitted against corresponding holes within the support housings (not shown) for conical bearing 600. This can help limit the rotation of bearing sleeve 604 within the support housing if shaft 602 were to catch against bearing sleeve 604.

Figure 11A:
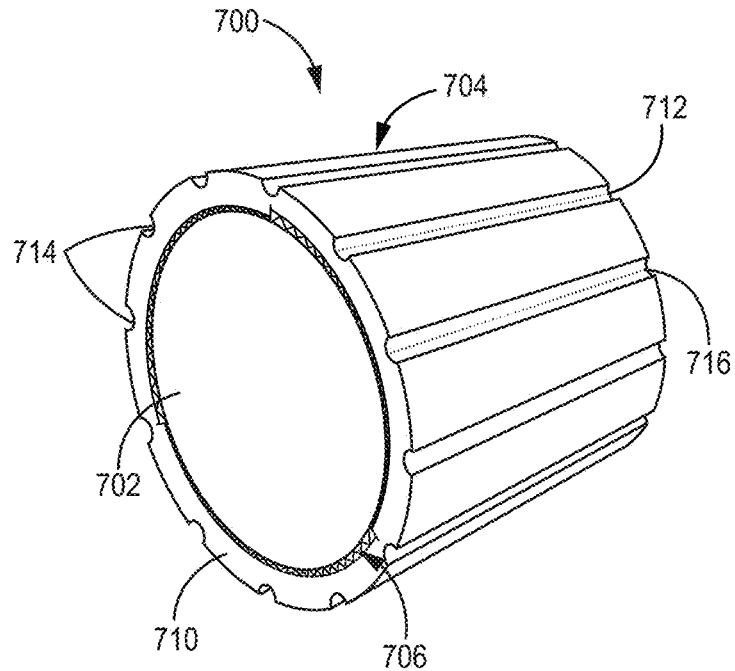
FIG. 11A is a perspective view of a conical bearing including channels and holes for cooling flow and hydrostatic air.
Figure 11B:
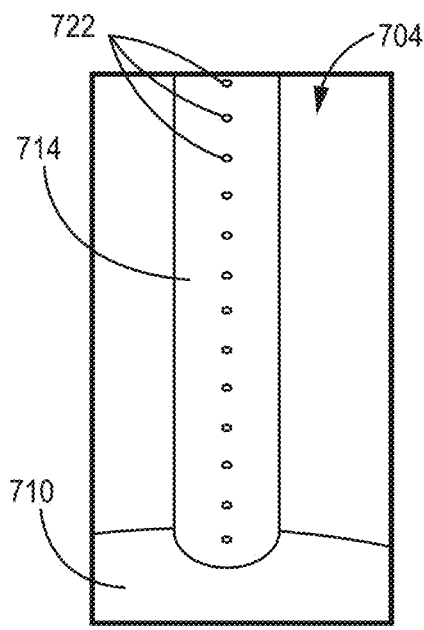
FIG. 11B is a top plan view of a channel of FIG. 11A including holes for cooling flow and hydrostatic air.
Figure 11C:
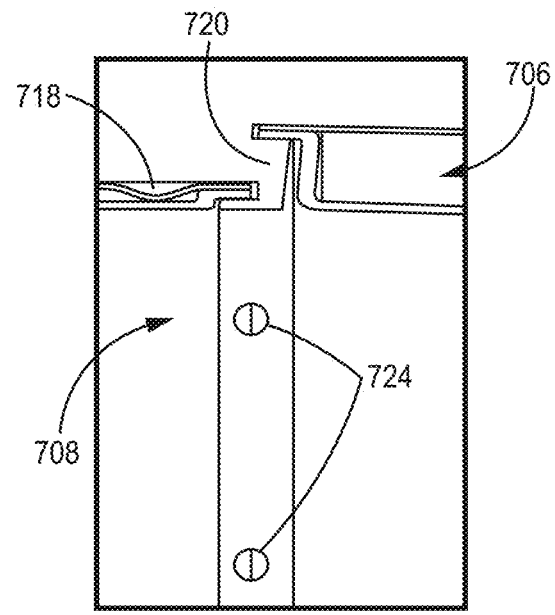
FIG. 11C is an interior view of the cooling holes of FIG. 11A.

FIG. 11A is a perspective view of conical bearing 700 oriented about shaft 702. Conical bearing 700 includes bearing sleeve 704, bump foil 706, and top foil 708 (shown in FIG. 11C). Conical bearing 700 extends from inner end 710 to outer end 712. In the example shown in FIGS. 11A-11C, conical bearing includes cooling channels 714 and cooling holes 716. FIG. 11B is a top plan view of a portion of bearing sleeve 704 including cooling channel 714 and cooling holes 716. FIG. 11C is an interior perspective view of conical bearing 700, including bearing sleeve 704, bump foil 706, top foil 708, cooling holes 716, foil bumps 718, and support dovetail 720. FIGS. 11A-11C will be discussed concurrently.

Conical bearing 700 can operate in substantially the same manner as conical bearing 100 (described above in reference to FIGS. 3A-5B and 7A-7C) with respect to the support of shaft 702 during rotation.

Cooling channels 714 can extend axially along the exterior surface of bearing sleeve 704. In examples of conical bearing 700 which include foil geometry support features (such as support dovetail 720 shown in FIG. 11C), a cooling channel 714 can be located radially outward from the support feature. Each cooling hole 716 can extend from an exterior end 722 (shown in FIG. 11B) to an interior end 724 (shown in FIG. 11C). Exterior ends 722 of cooling holes 716 can be situated within a cooling channel 714, and cooling holes 716 can extend radially inward through bearing sleeve 704 toward bump foil 706 and top foil 708. In examples of conical bearing 700 which include foil geometry support features (such as support dovetail 720), cooling holes 716 can extend through the support feature such that interior ends 724 are adjacent to an interior cavity of conical bearing 700.

Cooling channels 714 and cooling holes 716 can facilitate cooling flow about shaft 702. High pressure air, or another fluid, can be directed along the exterior of bearing sleeve 704 along cooling channels 714, and additionally or alternatively can be injected into conical bearing 700 to enable hybridization of the bearing by combining hydrodynamic and hydrostatic bearing for improved load capacity. Conical bearing 700 can utilize both hydrodynamic and hydrostatic air to more efficiently cool both conical bearing 700 and shaft 702, and provide increased air film stiffness to support high dynamic loads. Cooling channels 714 can provide air flow passages to dissipate heat from conical bearing 700 via forced convection. Cooling holes 716 can supply additional cooling flow to conical bearing 700 via radial injection using a process fluid. Additionally or alternatively, a high pressure process fluid can be drawn into cooling holes 716 from an external source, such as compressor bleed air. This provides hydrostatic air to increase air film stiffness and improve bearing load capacity. Cooling holes 716 thus act as a control orifice to regulate bearing supply pressure hydrostatically.

It should be understood that any of the features described above in reference to FIGS. 3A-11C can be combined into a single conical bearing. For example, a single conical bearing can incorporate any combination of axial splits in the bump foil and/or top foil, pad segments forming the bump foil and/or top foil, varying bump height, varying bump pitch, one or more support slots, one or more support dovetails, one or more anti-rotation tabs, cooling channels, and cooling holes.

A conical bearing as described herein provides numerous advantages. Integrating the axial and radial support elements removes the need for shimming and allows for the elimination of thrust bearings in the bearing system. This reduces the mass and complexity of rotor assemblies, and further can reduce the possible points of failure within the bearing system. Additionally, varying bump foil stiffness achieved through the variation of bump height and/or bump pitch accounts for changes in the direction of the loads exerted by the shaft. The conical bearing designs described herein are scalable and can be suitable for aerospace or non-aerospace applications. Axially split foil components can reduce global deformation of the bearing assembly by allowing each of the split components to locally deform independently of each other. The bearing sleeve of the conical bearing can be additively manufactured to include features such as support slots or dovetails to retain the foil ends, anti-rotation tabs, cooling channels, and/or cooling holes, which can further improve the reliability and performance of the conical bearing. Finally, the cooling components can enable hybrid (both hydrodynamic and hydrostatic) cooling of the bearing (that is, axially along the bearing, as well as through the cooling holes within the cooling channels).

DISCUSSION OF POSSIBLE EMBODIMENTS

The following are non-exclusive descriptions of possible embodiments of the present invention.

A conical bearing includes a bearing sleeve, a bump foil, and a top foil. The bearing sleeve extends along an axis from a first open end to a second open end. The bearing sleeve has an axially tapered shape such that a first open end diameter of the bearing sleeve is greater than a second open end diameter of the bearing sleeve. An interior surface of the bearing sleeve has a non-circular profile. The bump foil is concentrically disposed within the bearing sleeve with respect to the axis and includes a plurality of bump foil pad segments extending circumferentially about the interior surface of the bearing sleeve. Each bump foil pad segment comprises a plurality of foil bumps and the plurality of foil bumps varies in stiffness along a circumference of the bump foil. The top foil is concentrically disposed within the bump foil with respect to the axis and includes a plurality of top foil pad segments extending circumferentially about an interior surface of the bump foil.

The conical bearing of the preceding paragraph can optionally include, additionally and/or alternatively, any one or more of the following features, configurations and/or additional components:

A conical bearing according to an exemplary embodiment of the present invention, among other possible things, includes a bearing sleeve, a bump foil, and a top foil. The bearing sleeve extends along an axis from a first open end to a second open end. The bearing sleeve has an axially tapered shape such that a first open end diameter of the bearing sleeve is greater than a second open end diameter of the bearing sleeve. An interior surface of the bearing sleeve has a non-circular profile. The bump foil is concentrically disposed within the bearing sleeve with respect to the axis and includes a plurality of bump foil pad segments extending circumferentially about the interior surface of the bearing sleeve. Each bump foil pad segment comprises a plurality of foil bumps and the plurality of foil bumps varies in stiffness along a circumference of the bump foil. The top foil is concentrically disposed within the bump foil with respect to the axis and includes a plurality of top foil pad segments extending circumferentially about an interior surface of the bump foil.

A further embodiment of the foregoing conical bearing, wherein the plurality of foil bumps varies in height along the circumference of the bump foil.

A further embodiment of any of the foregoing conical bearings, wherein the plurality of foil bumps varies in pitch along the circumference of the bump foil.

A further embodiment of any of the foregoing conical bearings, wherein the plurality of foil bumps varies in height and pitch along the circumference of the bump foil.

A further embodiment of any of the foregoing conical bearings, wherein the bump foil is axially split such that the bump foil comprises a first bump foil section and a second bump foil section.

A further embodiment of any of the foregoing conical bearings, wherein each of the first bump foil section and the second bump foil section comprise three bump foil pad segments.

A further embodiment of any of the foregoing conical bearings, wherein each bump foil pad segment extends circumferentially about one third of the circumference of the bump foil.

A further embodiment of any of the foregoing conical bearings, wherein the top foil is axially split such that the top foil comprises a first top foil section and a second top foil section.

A further embodiment of any of the foregoing conical bearings, wherein each of the first top foil section and the second top foil section comprises three top foil pad segments.

A further embodiment of any of the foregoing conical bearings, wherein the bearing sleeve comprises a plurality of cooling channels extending axially along an exterior surface of the bearing sleeve.

A further embodiment of any of the foregoing conical bearings, further comprising a plurality of cooling holes extending radially outward through the bearing sleeve such that an interior end of each cooling hole is adjacent to an interior cavity of the conical bearing and an exterior end of each cooling hole is within a cooling channel.

A shaft system includes a shaft and a conical bearing oriented about an end of the shaft. The conical bearing includes a bearing sleeve, a bump foil, and a top foil. The bearing sleeve extends along an axis from a first open end to a second open end. The bearing sleeve has an axially tapered shape such that a first open end diameter of the bearing sleeve is greater than a second open end diameter of the bearing sleeve. An interior surface of the bearing sleeve has a non-circular profile. The bump foil is concentrically disposed within the bearing sleeve with respect to the axis and includes a plurality of bump foil pad segments extending circumferentially about the interior surface of the bearing sleeve. Each bump foil pad segment comprises a plurality of foil bumps and the plurality of foil bumps varies in stiffness along a circumference of the bump foil. The top foil is concentrically disposed within the bump foil with respect to the axis and includes a plurality of top foil pad segments extending circumferentially about an interior surface of the bump foil.

The shaft system of the preceding paragraph can optionally include, additionally and/or alternatively, any one or more of the following features, configurations and/or additional components:

A shaft system according to an exemplary embodiment of the present invention, among other possible things, includes a shaft and a conical bearing oriented about an end of the shaft. The conical bearing includes a bearing sleeve, a bump foil, and a top foil. The bearing sleeve extends along an axis from a first open end to a second open end. The bearing sleeve has an axially tapered shape such that a first open end diameter of the bearing sleeve is greater than a second open end diameter of the bearing sleeve. An interior surface of the bearing sleeve has a non-circular profile. The bump foil is concentrically disposed within the bearing sleeve with respect to the axis and includes a plurality of bump foil pad segments extending circumferentially about the interior surface of the bearing sleeve. Each bump foil pad segment comprises a plurality of foil bumps and the plurality of foil bumps varies in stiffness along a circumference of the bump foil. The top foil is concentrically disposed within the bump foil with respect to the axis and includes a plurality of top foil pad segments extending circumferentially about an interior surface of the bump foil.

A further embodiment of the foregoing shaft system, wherein the plurality of foil bumps varies in height and pitch along the circumference of the bump foil according to an expected load exerted on the conical bearing by the shaft during rotation of the shaft.

A method of manufacturing a conical bearing includes manufacturing a bearing sleeve of the conical bearing such that the bearing sleeve extends about a central bearing sleeve cavity from a first open end to a second open end and has a tapered shape such that a first open end diameter of the bearing sleeve is greater than a second open end diameter of the bearing sleeve, and such that an interior surface of the bearing sleeve has a non-circular profile. A plurality of bump foil pad segments are manufactured, wherein each bump foil pad segment comprises a plurality of foil bumps and the plurality of foil bumps varies in stiffness along a length of the bump foil pad segment. A plurality of top foil pad segments are manufactured. The bump foil pad segments are assembled into a bump foil which extends about a central bump foil cavity from a first open end to a second open end and has a tapered shape such that a first open end diameter of the bump foil is greater than a second open end diameter of the bump foil. The top foil pad segments are assembled into a top foil which extends about a central top foil cavity from a first open end to a second open end and has a tapered shape such that a first open end diameter of the top foil is greater than a second open end diameter of the top foil. The bump foil is inserted into the central bearing sleeve cavity through the first open end of the bearing sleeve such that the bump foil is concentrically disposed within the bearing sleeve with respect to an axis about which the bearing sleeve extends. The top foil is inserted into the central bump foil cavity through the first open end of the bump foil such that the top foil is concentrically disposed within the bump foil with respect to the axis.

The method of the preceding paragraph can optionally include, additionally and/or alternatively, any one or more of the following features, configurations and/or additional components:

A method of manufacturing a conical bearing according to an exemplary embodiment of the present invention, among other possible things, includes manufacturing a bearing sleeve of the conical bearing such that the bearing sleeve extends about a central bearing sleeve cavity from a first open end to a second open end and has a tapered shape such that a first open end diameter of the bearing sleeve is greater than a second open end diameter of the bearing sleeve, and such that an interior surface of the bearing sleeve has a non-circular profile. A plurality of bump foil pad segments are manufactured, wherein each bump foil pad segment comprises a plurality of foil bumps and the plurality of foil bumps varies in stiffness along a length of the bump foil pad segment. A plurality of top foil pad segments are manufactured. The bump foil pad segments are assembled into a bump foil which extends about a central bump foil cavity from a first open end to a second open end and has a tapered shape such that a first open end diameter of the bump foil is greater than a second open end diameter of the bump foil. The top foil pad segments are assembled into a top foil which extends about a central top foil cavity from a first open end to a second open end and has a tapered shape such that a first open end diameter of the top foil is greater than a second open end diameter of the top foil. The bump foil is inserted into the central bearing sleeve cavity through the first open end of the bearing sleeve such that the bump foil is concentrically disposed within the bearing sleeve with respect to an axis about which the bearing sleeve extends. The top foil is inserted into the central bump foil cavity through the first open end of the bump foil such that the top foil is concentrically disposed within the bump foil with respect to the axis.

A further embodiment of the foregoing method, wherein manufacturing the bearing sleeve comprises additively manufacturing the bearing sleeve.

A further embodiment of any of the foregoing methods, wherein additively manufacturing the bearing sleeve comprises forming at least one support slot in the interior surface of the bearing sleeve. Inserting the bump foil into the central bearing sleeve cavity comprises inserting a portion of at least one bump foil pad segment into the at least one support slot. Inserting the top foil into the central bump foil cavity comprises inserting a portion of at least one top foil pad segment into the at least one support slot.

A further embodiment of any of the foregoing methods, wherein additively manufacturing the bearing sleeve comprises forming at least one support dovetail in the interior surface of the bearing sleeve. Inserting the bump foil into the central bearing sleeve cavity comprises inserting a portion of at least one bump foil pad segment into the at least one support dovetail. Inserting the top foil into the central bump foil cavity comprises inserting a portion of at least one top foil pad segment into the at least one support dovetail.

A further embodiment of any of the foregoing methods, wherein additively manufacturing the bearing sleeve comprises forming a plurality of cooling channels in an exterior surface of the bearing sleeve.

A further embodiment of any of the foregoing methods, wherein additively manufacturing the bearing sleeve comprises forming a plurality of cooling holes extending radially outward through the bearing sleeve such that an interior end of each cooling hole is adjacent to the central bearing sleeve cavity and an exterior end of each cooling hole is within a cooling channel.

A further embodiment of any of the foregoing methods, wherein manufacturing the plurality of bump foil pad segments comprises shaping a sheet metal with a die to form the plurality of foil bumps, and wherein the plurality of foil bumps varies in height and pitch along the length of each bump foil pad segment according to an expected load exerted on the conical bearing by the shaft during rotation of the shaft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A conical bearing comprising:
   a bearing sleeve extending along an axis from a first open end to a second open end, and having an axially tapered shape such that a first open end diameter of the bearing sleeve is greater than a second open end diameter of the bearing sleeve, wherein an interior surface of the bearing sleeve has a non-circular profile;
   a bump foil concentrically disposed within the bearing sleeve with respect to the axis and comprising a first bump foil section extending from the first open end of the bearing sleeve to align with a second bump foil section extending to the second end of the bearing sleeve, wherein each foil bump section further comprises a plurality of bump foil pad segments extending circumferentially about the interior surface of the bearing sleeve, wherein each bump foil pad segment comprises a plurality of foil bumps and the plurality of foil bumps varies in stiffness along a circumference of the bump foil; and
   a top foil concentrically disposed within the bump foil with respect to the axis and comprising a first top foil section extending from the first open end of the bearing sleeve to align with a second first top foil section extending to the second end of the bearing sleeve, wherein each top foil section further comprises a plurality of top foil pad segments extending circumferentially about an interior surface of the bump foil.

2. The conical bearing of claim 1, wherein the plurality of foil bumps varies in height along the circumference of the bump foil.

3. The conical bearing of claim 1, wherein the plurality of foil bumps varies in pitch along the circumference of the bump foil.

4. The conical bearing of claim 1, wherein the plurality of foil bumps varies in height and pitch along the circumference of the bump foil.

5. The conical bearing of claim 1, wherein the bump foil is axially split such that the top foil comprises a first bump foil section and a second bump foil section.

6. The conical bearing of claim 5, wherein each of the first bump foil section and the second bump foil section comprise three bump foil pad segments.

7. The conical bearing of claim 6, wherein each bump foil pad segment extends circumferentially about one third of the circumference of the bump foil.

8. The conical bearing of claim 1, wherein the top foil is axially split such that the top foil comprises a first top foil section and a second top foil section.

9. The conical bearing of claim 8, wherein each of the first top foil section and the second top foil section comprises three top foil pad segments.

10. The conical bearing of claim 1, wherein the bearing sleeve comprises a plurality of cooling channels extending axially along an exterior surface of the bearing sleeve.

11. The conical bearing of claim 10, further comprising a plurality of cooling holes extending radially outward through the bearing sleeve such that an interior end of each cooling hole is adjacent to an interior cavity of the conical bearing and an exterior end of each cooling hole is within a cooling channel.

12. A shaft system comprising:
a shaft; and
a conical bearing oriented about an end of the shaft, the conical bearing comprising:
a bearing sleeve extending along an axis from a first open end to a second open end, and having an axially tapered shape such that a first open end diameter of the bearing sleeve is greater than a second open end diameter of the bearing sleeve, wherein an interior surface of the bearing sleeve has a non-circular profile, and wherein a plurality of cooling channels extend axially from the first open end to the second open end along an exterior surface of the bearing sleeve;
a bump foil concentrically disposed within the bearing sleeve with respect to the axis and comprising a plurality of bump foil pad segments extending circumferentially about the interior surface of the bearing sleeve, wherein each bump foil pad segment comprises a plurality of foil bumps and the plurality of foil bumps varies in stiffness about a circumference of the bump foil; and
a top foil concentrically disposed within the bump foil with respect to the axis and comprising a plurality of top foil pad segments extending circumferentially about an interior surface of the bump foil.

13. The shaft system of claim 12, wherein the plurality of foil bumps varies in height and pitch along the circumference of the bump foil according to an expected load exerted on the conical bearing by the shaft during rotation of the shaft.

14. A method of manufacturing a conical bearing, the method comprising:
manufacturing a bearing sleeve of the conical bearing such that the bearing sleeve extends about a central bearing sleeve cavity from a first open end to a second open end and has a tapered shape such that a first open end diameter of the bearing sleeve is greater than a second open end diameter of the bearing sleeve, and such that an interior surface of the bearing sleeve has a non-circular profile;
manufacturing a first bump foil section and a second bump foil section, wherein each foil bump section includes a plurality of bump foil pad segments, wherein each bump foil pad segment comprises a plurality of foil bumps and the plurality of foil bumps varies in stiffness along a length of the bump foil pad segment;
manufacturing a first top foil section and a second top foil section, wherein each top foil section includes a plurality of top foil pad segments;
assembling the bump foil pad segments of the first bump foil section and the second boil foil section into a bump foil which extends about a central bump foil cavity from a first open end to a second open end and has a tapered shape such that a first open end diameter of the bump foil is greater than a second open end diameter of the bump foil;
assembling the top foil pad segments of the first top foil section and the second top foil section into a top foil which extends about a central top foil cavity from a first open end to a second open end and has a tapered shape such that a first open end diameter of the top foil is greater than a second open end diameter of the top foil;
inserting the bump foil into the central bearing sleeve cavity through the first open end of the bearing sleeve such that the bump foil is concentrically disposed within the bearing sleeve with respect to an axis about which the bearing sleeve extends; and
inserting the top foil into the central bump foil cavity through the first open end of the bump foil such that the top foil is concentrically disposed within the bump foil with respect to the axis.

15. The method of claim 14, wherein manufacturing the bearing sleeve comprises additively manufacturing the bearing sleeve.

16. The method of claim 15, wherein:
additively manufacturing the bearing sleeve comprises forming at least one support slot in the interior surface of the bearing sleeve;
inserting the bump foil into the central bearing sleeve cavity comprises inserting a portion of at least one bump foil pad segment into the at least one support slot; and
inserting the top foil into the central bump foil cavity comprises inserting a portion of at least one top foil pad segment into the at least one support slot.

17. The method of claim 15, wherein:
additively manufacturing the bearing sleeve comprises forming at least one support dovetail in the interior surface of the bearing sleeve;
inserting the bump foil into the central bearing sleeve cavity comprises inserting a portion of at least one bump foil pad segment into the at least one support dovetail; and
inserting the top foil into the central bump foil cavity comprises inserting a portion of at least one top foil pad segment into the at least one support dovetail.

18. The method of claim 15, wherein additively manufacturing the bearing sleeve comprises forming a plurality of cooling channels in an exterior surface of the bearing sleeve.

19. The method of claim 18, wherein additively manufacturing the bearing sleeve comprises forming a plurality of cooling holes extending radially outward through the bearing sleeve such that an interior end of each cooling hole is adjacent to the central bearing sleeve cavity and an exterior end of each cooling hole is within a cooling channel.

20. The method of claim 14, wherein manufacturing the plurality of bump foil pad segments comprises shaping a sheet metal with a die to form the plurality of foil bumps, and wherein the plurality of foil bumps varies in height and pitch along the length of each bump foil pad segment according to an expected load exerted on the conical bearing by the shaft during rotation of the shaft.

* * * * *